United States Patent
Kartzmark et al.

(10) Patent No.: US 7,310,631 B2
(45) Date of Patent: Dec. 18, 2007

(54) METHOD AND SYSTEM FOR FACILITATING ACCESS TO EXTERNAL DATA

(75) Inventors: Martin Kartzmark, Weston, FL (US); Terry Mraz, Weston, FL (US); Ana M. Muniz, Pembroke Pines, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 339 days.

(21) Appl. No.: 10/708,589

(22) Filed: Mar. 12, 2004

(65) Prior Publication Data
US 2005/0203939 A1    Sep. 15, 2005

(51) Int. Cl.
G06F 17/30 (2006.01)
G06F 9/45 (2006.01)

(52) U.S. Cl. .......................... 707/3; 717/136

(58) Field of Classification Search ............... 707/3, 707/1, 101, 102, 104, 104.1; 717/136, 138, 717/139
See application file for complete search history.

(56) References Cited

U.S. PATENT DOCUMENTS

| | | | |
|---|---|---|---|
| 6,480,860 B1 * | 11/2002 | Monday | 707/102 |
| 6,604,100 B1 * | 8/2003 | Fernandez et al. | 707/3 |
| 6,772,413 B2 * | 8/2004 | Kuznetsov | 717/136 |
| 6,816,864 B2 * | 11/2004 | Deuser et al. | 707/100 |
| 6,934,712 B2 * | 8/2005 | Kiernan et al. | 707/102 |
| 7,028,312 B1 * | 4/2006 | Merrick et al. | 719/330 |

\* cited by examiner

Primary Examiner—Don Wong
Assistant Examiner—Hung Tran Vy
(74) Attorney, Agent, or Firm—Fitzpatrick, Cella, Harper & Scinto

(57) ABSTRACT

A system for providing application access to external data uses a data component that translates requests for data into .NET objects. The .NET objects are used to retrieve information from a variety of different data sources that contain data stored in a number of different formats. The data component retrieves the data from the data sources and creates a response .NET object that can be transmitted to a requestor. The data component uses a DST that defines the manner in which data is to be retrieved. To retrieve data from a new data source, it is only necessary to create a new DST. In such a manner, a requestor can retrieve data without the need to translate data into a particular format. Therefore, the .NET object may be available via a web service, thereby allowing access via a variety of different computing tools such as, for example, a personal computer, a telephone, and a PDA.

9 Claims, 4 Drawing Sheets

METHOD AND SYSTEM FOR FACILITATING ACCESS TO EXTERNAL DATA

FIELD OF INVENTION

This application generally discloses a method of accessing information and, more particularly, a computer-implemented system and method for facilitating the access and exchange of information among otherwise incompatible computing systems.

BACKGROUND OF INVENTION

Computer software has typically been operable only on the specific computing platform for which the software was created. For example, software developed for use on the Linux® operating system is typically not operable on computers running the Microsoft Windows® operating system. Similarly, the data stored by the various programs may not be stored on systems run by different operating systems. Thus, in order to share programs and data among various incompatible platforms, the programs and data were first converted to be operable on all the desired platforms.

In the past, different data has been stored and maintained on various different computing platforms. For example, certain entities use systems based on Microsoft technology, such as, for example, Windows NT, Internet Information Services ("IIS"), and Component Object Model ("COM"). Other entities may use systems based on a UNIX platform, such as those developed by Sun Microsystems, using programs such as, for example, WebSphere Application Server ("WAS") and programming languages such as JAVA. In certain situations, a single organization may use two or more different platforms. In other situations, one organization may wish to share data or programs with another organization which uses a different computing platform.

With the recent proliferation of the use of the Internet and the growth in connectivity between computers, it has become more desirable to share data and programs among various distributed locations. Of particular interest is the ability to access various pieces of information, even when the data and programs containing the information were created for incompatible platforms. In the past, tools were used to convert programs such that they are operable on other platforms. However, such tools tended to be cumbersome, expensive, and wasteful in the use of computing resources. Therefore, there is a need for an efficient tool that allows for the use of various programs and data across multiple platforms.

SUMMARY OF INVENTION

In general, the present invention uses a transaction infrastructure (e.g., .NET component, JavaBeans, Java Enterprise Edition, etc.) to provide access to external data. The access to the external data is provided via an interface that takes a request object and returns a response object. The objects include "application syntax," and make the underlying protocol/data formats invisible to the user of a system of the present invention.

More particularly, the system provides application access to external data by using a data component that translates requests for data into .NET objects. The .NET objects are used to retrieve information from a variety of different data sources that contain data stored in a number of different formats. The data component retrieves the data from the data sources and creates a response .NET object that can be transmitted to a requestor. The manner in which a data component accesses data may be defined by a Data Service Transaction ("DST"). A DST may comprise two different files: an XML file defining the attributes of the transaction; and a Dynamic Link Library ("DLL") generated from the XML file that defines the input and output objects to be passed to and from the data component when accessing the transaction.

To retrieve data from a new data source, it is only necessary to create a new DST. In such a manner, a requester can retrieve data without the need to translate data into a particular format. In this embodiment, the NET object may be available via a web service, thereby allowing access via a variety of different computing tools such as, for example, a personal computer, a telephone, and a PDA.

A DST is created by first defining the interface to be used. The DST is then automatically created and stored in a location accessible by the data component. When a request is sent to the data component in the form of a NET object, the data component retrieves the DST associated with the request. The data component then creates a dynamic key to determine if the request has already been processed. The data component determines if a transformation of data is required. If not, the request is sent as an XML stream. If transformation is required, the request is translated into the appropriate format. The message is then sent to the data source.

To retrieve information, the DST is retrieved to determine the status of the request. If the request is complete, the data is obtained in an XML format and passed to a service provider component. The result of the request is obtained, then transformed into XML. The XML data is returned to the data component, which converts the XML into a NET object and sends the object to the requesting component.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
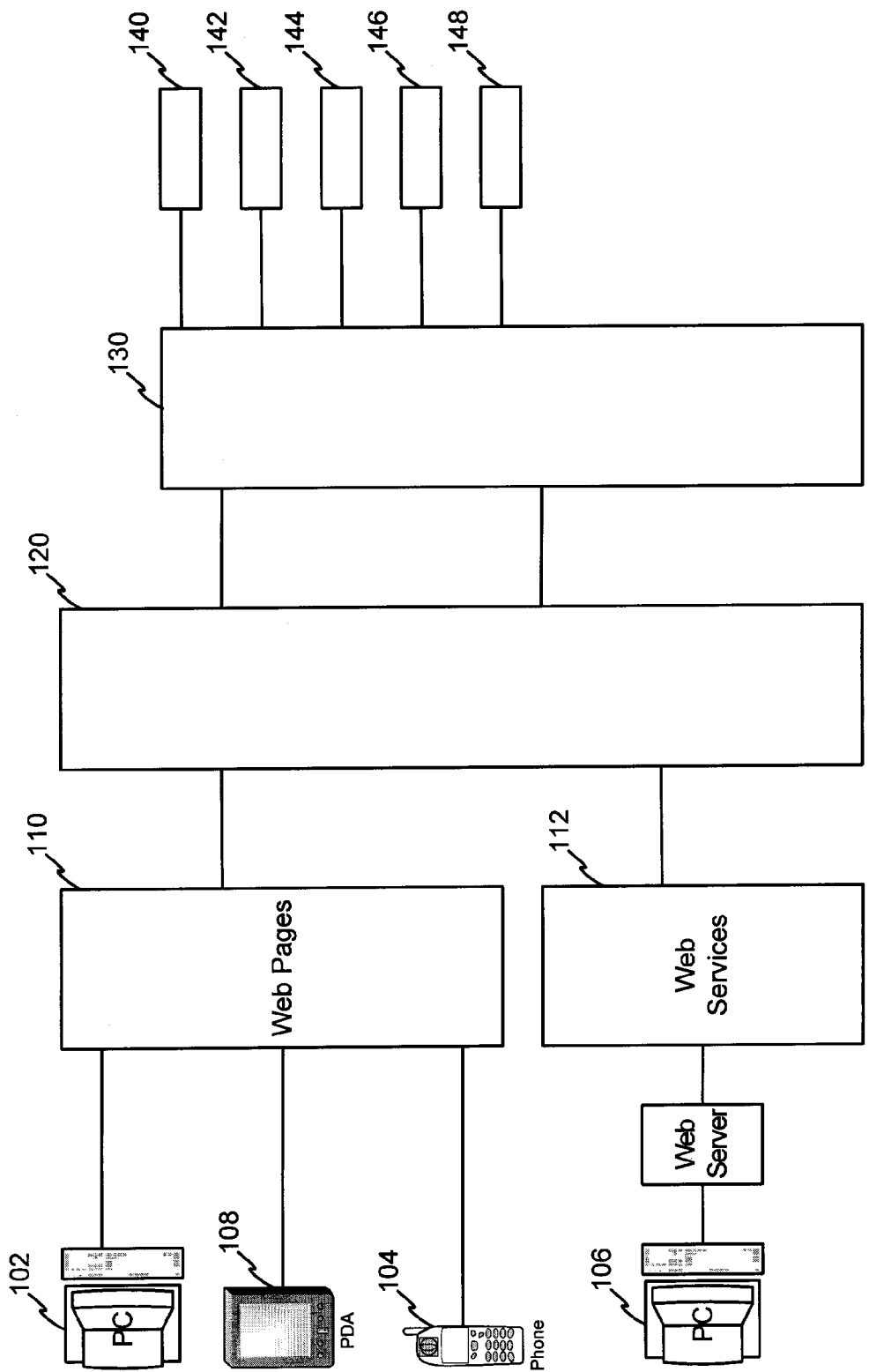
FIG. 1 presents a block diagram system overview of an embodiment of the present invention.

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system of the present invention.

A system of the present invention may include a host server or other computing systems including a processor for processing digital data, memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor, and a plurality of databases, said databases including client data, seller data, supplier data and/or like data that could be used in association with the present invention. As those skilled in the art will appreciate, a computer will typically include an operating system (e.g., Windows NT, 95/98/2000, Linux, Solaris, etc.) as well as various conventional support software and drivers typically associated with computers.

The applications discussed herein may be associated with databases. The term "database", "data sources" or similar terms may refer to any type of data organizing mechanism, such as relational databases, hierarchical databases, object-oriented databases, spreadsheets, and/or the like. Common database products that may be used to implement the databases include DB2 by IBM (Armonk, N.Y.), any of the database products available from Oracle Corporation (Redwood Shores, Calif.), Microsoft Access, Microsoft Excel, or SQL Server by Microsoft Corporation (Redmond, Wash., or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example. It should also be understood that a system of the present invention is not limited to a physical implementation of a single repository of information. It is also possible to have multiple repositories of information. The multiple repositories may be linked together in a variety of different manners to create a single logical repository of information.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

In general, an embodiment of the present invention provides a single interface (or reduced number of interfaces) for facilitating multiple components access to data. Such an interface is provided by, for example, creating a data access layer in a generic format, such that the data access layer can be accessed by a Microsoft .NET application or any transaction infrastructure or similar application. In such a manner, a variety of different programs and devices can access a single system, without needing to translate information from different formats. One skilled in the art will appreciate that, while certain embodiments may be disclosed in terms of the .NET application, the invention is not so limited and any application which performs functions similar to the Microsoft .NET application may be used in the present invention in place of, or in addition to, the .NET object as used herein, such as, for example, a JAVA application (e.g., JavaBeans, Java Enterprise Edition).

An "object" used herein includes small program that performs a specific function (e.g., send a query to a database or send results of a query to another object or application). As such, programs can utilize the "services" of objects without having to contain the code internally, thus saving development time, code redundancy and a theoretical increase in computing efficiency. A ".Net" object as used herein includes architecture configured to add portability to applications and also allows a program to be written in multiple languages and compiled as one. More specifically, Microsoft® NET is a set of Microsoft software technologies for connecting information, people, systems, and devices. .NET facilitates the integration of software applications and data through the use of web services. The .NET framework may include two main parts, namely the common language runtime (CLR) and a unified, hierarchical class library that includes a Active Server Pages (ASP.NET®), an environment for building smart client applications (Windows Forms), and a data access subsystem (ADO.NET®).

FIG. 1 is a block diagram illustrating an exemplary interaction of an embodiment of the present invention with multiple systems. A variety of different apparatuses, such as PC 102, telephone 104, PC 106 and PDA 108, can access systems such as web pages 110 or web services 112 (via a web server). Web services include discrete, building-block applications that connect to each other as well as to other, larger applications over a network. Web pages 110 and web services 112 are used to access business components 120. By accessing business components 120 through web pages 110 and web services 112, a user can perform a variety of different tasks, such as performing sales and marketing tasks, servicing accounts, and the like. Business components 120 may need to access data from a variety of different data sources, such as data sources 140, 142, 144, 146, and 148. Because data sources 140, 142, 144, 146, and 148 may be in a variety of different formats, it may not be possible for business components 120 to directly access the data. Business components 120 access data sources 140, 142, 144, 146, and 148 through data component 130.

Data component 130 is configured to convert any portion or all data from data sources 140, 142, 144, 146, and 148 into a NET object. Thereafter, business component 120 is configured to retrieve the NET object from data component 130. In addition, business components 120 can be configured to make requests for certain portions of data. Such requests are transmitted to data component 130 as .NET objects. Data component 130 can then access the requested data from one of data sources 140, 142, 144, 146, and 148.

The manner in which data component 130 accesses data may be defined by a Data Service Transaction ("DST"). A DST may comprise two different files: an XML file defining the attributes of the transaction; and a Dynamic Link Library ("DLL") generated from the XML file that defines the input and output objects to be passed to and from data component 130 when accessing the transaction. The usefulness of using a DST is readily apparent—a new data source can be accessed merely by creating a DST that defines how the new data source is organized. The organization of the data source may be provided by the data provider of the data source. For example, for a mainframe COBOL program, the REQUEST CHAPTER and REPLY CHAPTER layouts are provided. For a data source with an XML interface, a sample XML request stream and sample XML response stream is typically provided. For a DB2 database, the stored procedure name and interface may be provided, along with a list of elements of any record sets returned. The stored procedure name, interface and list of record sets may also be used to automatically import and generate a DST.

The XML schema used by the DST may be one of a variety of different formats. In one exemplary embodiment, the DST contains the following information: message type; Input; Output; Hub Version; and Element. In one embodiment, for every transaction supported by data services, an XML transformation file is placed in a path referred to in the registry entry, such as, for example:

HKEY_LOCAL_MACHINE\SOFTWARE\American Express\SDP\TransactionDirectory. Furthermore, XVI-INFO01 may be a data service transaction, and for the application using data services to access the Processor Profile, the XVI-INFO01.XML transformation file resides in the directory specified at the above registry entry.

As used herein, a DST file is an XML document which may follow the exemplary schema for the XML transformation files below.

```
<?xml version="1.0" encoding="utf-8"?>
<xs:schema elementFormDefault="qualified"
xmlns:xs="http://www.w3.org/2001/XMLSchema">
    <xs:element name="Transaction" type="TransactionType" />
    <xs:complexType name="TransactionType">
        <xs:sequence>
            <xs:element minOccurs="0" maxOccurs="1" name="ProcessorProfile"
type="ProcessorProfileType" />
            <xs:element minOccurs="0" maxOccurs="1" name="AuthorizationTransaction"
type="AuthorizationTransactionType" />
            <xs:element minOccurs="0" maxOccurs="1" name="RuleService"
type="AuthorizationTransactionType" />
            <xs:element minOccurs="0" maxOccurs="1" name="DB2StoredProcedure"
type="AuthorizationTransactionType" />
            <xs:element minOccurs="0" maxOccurs="1" name="Input" type="InputType" />
            <xs:element minOccurs="0" maxOccurs="1" name="Output" type="OutputType" />
        </xs:sequence>
        <xs:attribute name="ID" type="xs:string" />
        <xs:attribute name="Name" type="xs:string" />
        <xs:attribute name="Timeout" type="xs:long" />
        <xs:attribute name="Cachable" type="xs:boolean" />
        <xs:attribute name="Resendable" type="xs:boolean" />
        <xs:attribute name="FEPI" type="xs:boolean" />
        <xs:attribute name="AmexIDRequired" type="xs:boolean" />
        <xs:attribute name="MessageType" type="xs:string" />
        <xs:attribute name="Description" type="xs:string" />
        <xs:attribute name="Update" type="xs:boolean" />
        <xs:attribute name="Persistent" type="xs:boolean" />
        <xs:attribute name="HubVersion" type="xs:String" />
    </xs:complexType>
    <xs:complexType name="ProcessorProfileType">
        <xs:attribute name="Name" type="xs:string" />
        <xs:attribute name="XMLTag" type="xs:string" />
        <xs:attribute name="HubEnabled" type="xs:int" />
        <xs:attribute name="AmexIDRequired" type="xs:boolean" />
        <xs:attribute name="Transform" type="xs:boolean" />
    </xs:complexType>
    <xs:complexType name="AuthorizationTransactionType">
        <xs:attribute name="Name" type="xs:string" />
    </xs:complexType>
    <xs:complexType name="DB2StoredProcedureType">
        <xs:attribute name="Name" type="xs:string" />
        <xs:attribute name="DSNRegistryLocation" type="xs:string" />
    </xs:complexType>
    <xs:complexType name="RuleServiceType">
        <xs:attribute name="RuleServerConfigFile" type="xs:string" />
        <xs:attribute name="RuleServer" type="xs:string" />
    </xs:complexType>
    <xs:complexType name="InputType">
```

```
            <xs:sequence>
                <xs:element minOccurs="0" maxOccurs="unbounded" name="Element"
type="ElementType" />
            </xs:sequence>
            <xs:attribute name="XMLTag" type="xs:string" />
            <xs:attribute name="Length" type="xs:int" />
        </xs:complexType>
        <xs:complexType name="ElementType">
            <xs:sequence>
                <xs:element minOccurs="0" maxOccurs="unbounded" name="Element"
type="ElementType" />
            </xs:sequence>
            <xs:attribute name="Length" type="xs:long" />
            <xs:attribute name="Offset" type="xs:long" />
            <xs:attribute name="XMLTag" type="xs:string" />
            <xs:attribute name="Name" type="xs:string" />
            <xs:attribute name="Key" type="xs:boolean" />
            <xs:attribute name="MaxRepeats" type="xs:long" />
            <xs:attribute name="RepeatsOffset" type="xs:long" />
            <xs:attribute name="RepeatsLength" type="xs:int" />
            <xs:attribute name="DataType" type="xs:int" />
            <xs:attribute name="Attribute" type="xs:boolean" />
            <xs:attribute name="Direction" type="xs:int" />
        </xs:complexType>
        <xs:complexType name="OutputType">
            <xs:sequence>
                <xs:element minOccurs="0" maxOccurs="unbounded" name="Element"
type="ElementType" />
            </xs:sequence>
            <xs:attribute name="XMLTag" type="xs:string" />
        </xs:complexType>
</xs:schema>
```

An exemplary definition of each element in this schema is set forth below. The transaction includes the root element of the XML transformation file and it may contain three child elements including input, output and data provider. The data provider may include a Authorization transaction element, an ProcessorProfile element, a RuleService element, and a DB2StoredProcedure element. The invention also contemplates that more elements are possible as more data providers are added to data services. The transaction may also include certain attributes, such as, for example, name, ID, timeout, cachable, resendable, FEPI (front end programming interface), AMEXIDRequired, MessageType, Description, Persistent, HubVersion and Update.

The input describes the input desired to access the transaction. The content of this schema element describes, if transformation is to be done, how to convert the XML passed to data services to the format expected by the data provider. The input may consist of none to many elements, and may include length and XMLTag attributes. The output describes the output returned from the transaction. The content of this schema element describes, if transformation is to be done, how to convert from the format returned by the data provider to the XML passed from data services. The output can consist of none to many elements, and may include the XMLTag attribute.

AuthorizationTransaction describes attributes specific to an authorization system such as Name and may only be present in an XML Transformation File if the Message Type is "Authorization". ProcessorProfile describes attributes specific to a message processor such as, for example, Name, XMLTag, HubEnabled, AmexIDRequired and Transform. ProcessorProfile may only be present in an XML Transformation File if the Message Type is "Processor". DB2StoredProcedure describes attributes specific to a DB2 Stored Procedure such as, for example, name and DNSRegistryLocation. DB2StoredProcedure may only present in an XML Transformation File if the Message Type is "DB2". RuleService describes attributes specific to a Rule Service such as, for example, RuleServerConfigFile and RuleServer. RuleService may only be present in an XML Transformation File if the Message Type is "RULSVC". Name describes Transaction Name. ID describes a transaction identifier which may be the same as the transaction name, but in other embodiments, it may be different. For example, for AuthorizationTransactions this is different, as the transaction ID on the hub is different than the transaction name used on the server. This ID is used to identify to the data provider (e.g., Authorization, Processor) the transaction being requested. Timeout describes the Default Transaction Timeout which is the maximum amount of time for the transaction. When calling DataServices.GetMessage, a timeout exception may be reported after this number of milliseconds has elapsed since the request was made which may be a default for the transaction. Application code, when calling data services, can specify a different timeout value.

Cachable indicates if cached data, when present, can be used for the transaction. In general, update transactions are not cachable which may be a default for the transaction. Application code, when calling data services, may request that data not be obtained from cache even if marked as cachable. Resendable may indicate if the transaction can be re-sent. FEPI (front end programming interface) indicates if the transaction uses a FEPI screen(s) and the system may use this information to determine if it is not safe to send a FEPI transaction because another FEPI transaction is still being processed. AmexIDRequired indicates if a transaction requires the user's ID and the system may use this information to determine whether to try to fetch the ID (from cache or XVAMXID02) prior to sending request to the servicing component.

MessageType is a type of transaction with the following exemplary values. If the transaction is a processor profile and if the value is Processor, the ProcessorProfile element must be present. If the transaction is a Authorization transaction and if the value is Authorization, the AuthorizationTransaction element must be present. If the transaction is a DB2 stored procedure and if the value is DB2, the DB2StoredProcedure element must be present. If transaction is a Rule Service and if the value is RULSVC, the RuleService element must be present. The MQXML is present if the transaction is a Hub service sending XML to the hub. As the system expands to connect to more data providers, the values may expand.

Persistent applies to transactions that use MQ for its communication protocol. If true, the message placed on the queue should be persistent, so that if something is down, the message is guaranteed to be delivered at a later time. This also causes the message to never expire, so if needed, the message will remain on the queue indefinitely, until it is removed from the queue. If false (default for SDP), the message expires according the Expiry registry entry, and is not persistent when placed on the PUT queue. HubVersion is the version of the hub header(s) to be used if the transaction uses the hub for transport. The version numbers include the following instructions: 0 Hub is not used; 1 RFH1 header is used for Hub communications when invoking this service; 2 RFH2 header is used for Hub communications when invoking this service; 3 EMI Envelope Version 0 is used for Hub communications when invoking this service; and, 4—EMI Envelope Version 1 is used for Hub communications when invoking this service. Update indicates if the transaction is an Update transaction. If a stored procedure is marked as an update transaction (i.e., this attribute is True), then an entry is added to the audit log every time the stored procedure is called. Otherwise, no audit entry is made. Description includes a brief description of the transaction.

The ProcessorProfile Schema Element Attributes include, for example, Name, XMLTag, HubEnabled, AmexIDRequired and Transform. Name refers to the name of Processor Profile which is sent in the Processor header to identify the profile. XML Tag may be used when sending Processor request in XML format to the hub. HubEnabled indicates whether the Processor profile should be accessed via the HUB wherein the codes may include, for example: 0 Should use point-to-point connection to Processor to access the Processor Profile; 1—Profile is available via the hub, and should be accessed through the hub using hub transformation (i.e., MRM data) and 2—Profile is available via the hub, and should be accessed through the hub, not using hub transformation [i.e., BLOB data]. AmexID may be similar to the Transaction attribute and it may instruct ProcessorServices whether to put the user's ID in Processor header when sending request to Processor. Transform instructs ProcessorServices whether XML Request sent to data services should be transformed to copybook format prior to sending the request to Processor, and response should be transformed from copybook format to XML after receiving response. This attribute may only apply if HubEnabled is 1 or 2.

The AuthorizationTransaction Schema Element Attributes may include Name and Transform. Name may include the name of the Authorization Transaction which may be sent in the TPF header sent to the authorization system. Transform may instruct AuthorizationServices whether XML Request sent to data services should be transformed to copybook format prior to sending the request to the authorization system, and response should be transformed from copybook format to XML after receiving response.

The DB2StoredProcedure Schema Element Attributes may include Name and RegistryLocation. The Name may be the name of DB2 Stored procedure to call, but it may or may not be the same as the transaction name. The DSNRegistryLocation may include the name of registry value that contains the connection string for the database where the stored procedure resides. All such registry entries may be in the registry key for DB2 and the value specifies the registry value within the registry key for DB2.

The RuleService Schema Element Attributes may include RuleServerConfigFile and RuleServer. RuleServerConfigFile may include the full path to the Rule Server Configuration File to be used for this Rule Service. RuleServer may include the name of the Rule Server for the rule service.

The Input Attributes and Elements may include XMLTag, Length and Element. XML Tag may be used in an XML document passed to data services to mark the root of the input elements. The Length may include the total length of the input buffer to be sent to the provider and it may be applicable to fixed length formats. The Element may include an input which may contain none to many elements and the Input elements may not utilize the element's Repeats Offset and Repeats Length attributes.

The Output Schema Element Attributes may include XMLTag and Element. XML Tag may be used in an XML document passed from data services to mark the root of the output elements. The Element may include an output which contains none to many elements and Input elements which may not utilize the element's Key attribute.

Access to the data sources 140, 142, 144, 146, and 148 may be accomplished using a "factory pattern" that delegates the work to sub-components that are configured to access data sources 140, 142, 144, 146, and 148. Therefore, if a new data source is added, only a new sub-component may be needed to access the new data source. Thereafter, a DST is created that allows data component 130 to interface with the new data source.

A "factory pattern" is a software design pattern used in the design of the data services, wherein the factory design pattern specifies a factory which clients may use to access "products" provided by the factory. The factory/data services may be the single interface isolating the application from the multiple components being used internally to access the external data. In certain embodiments, data services may use a variant of the design pattern which may not return the factory "product" to the client; rather, data services may use the product internally to access the requested data. The pattern may use a specialized object solely to create other objects.

Different variations of the factory pattern may be used with the present invention, although most variants typically use the same set of primary actors, a client, a factory, and a product. The client is an object that includes an instance of another object (the product) for some purpose. Rather than creating the product instance directly, the client may delegate this responsibility to the factory. Once invoked, the factory may create a new instance of the product, passing it back to the client. For a additional information related to the well known "factory pattern", see:

http://msdn.microsoft.com/library/default.asp?url=/library/en-us/dnbda/html/factopattern.asp, which is hereby incorporated by reference.

In certain embodiments, a new data source may be added when access to a new data source is desired using a communication protocol not yet supported by the data services. For example, a new sub-component may be added to access external web services. The sub-component may implement one or two methods, namely a PutMessage and a GetMessage if the communication protocol to the data source is inherently asynchronous (e.g., MQ), or Invoke, if the communication protocol to the data source is inherently synchronous (e.g., HTTP). In certain embodiments, a new sub-component may be added and derived from an existing sub-component due to some specific requirements for the data source. For example, MQXMLServices is a sub-component derived from MQServices, because it adds a header to every message that is sent to the data source (i.e., hub). A data source may consist of a variety of different components, including a service provider component and a data source. The operation of the service provider component and the data source will be discussed in further detail below.

Figure 2:
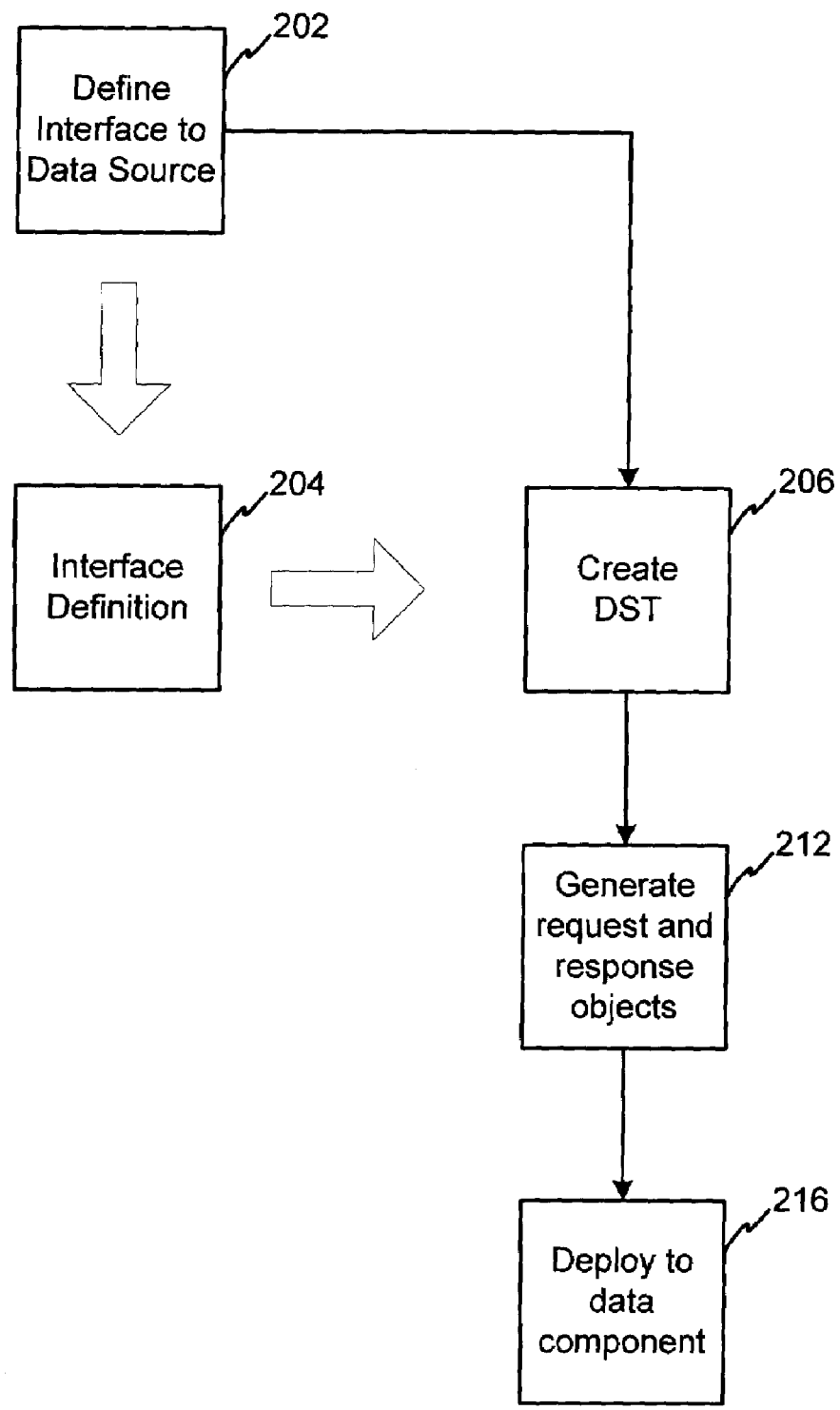
FIG. 2 presents a flow chart illustrating exemplary steps in creating a DST.

FIG. 2 includes a flowchart that illustrates the creation of a DST for a data source in an exemplary embodiment of the present invention. First, an interface to a data source is defined (step 202). The interface definition (204) is then used to create a DST (step 206). In one embodiment, a Windows application is used to create the DST. The data services dictionary GUI may provide an interface to view a list of data services transactions; view or modify the data service transaction definition; create a new data service transaction; import elements from a copybook layout or a DB2 stored procedure; generate input and output schemas for XML to/from data services to possibly hand off to the DAS (Data Architecture Services) for standardization; generate request and response classes/assemblies; and, compare/merge two versions of a transaction definition.

In one embodiment, the GUI creates the XML structure for the DST from the imported data (e.g., copybook, XML, element list). The DST is then used to build two XML schemas, namely, a request schema for the request object, and response schema for the response object (step 212). A Microsoft .Net utility (XSD.exe) is used to build class files from these schemas, wherein the class files are compiled into DLLs which are deployed to the configured servers are typically stored in a database within data component 130 (step 216). The DLLs may be deployed to the portion of the configured servers where the data services component is running. Thereafter, data component 130 is able to use the DST and request and response objects to retrieve data from the data source.

Figure 3:
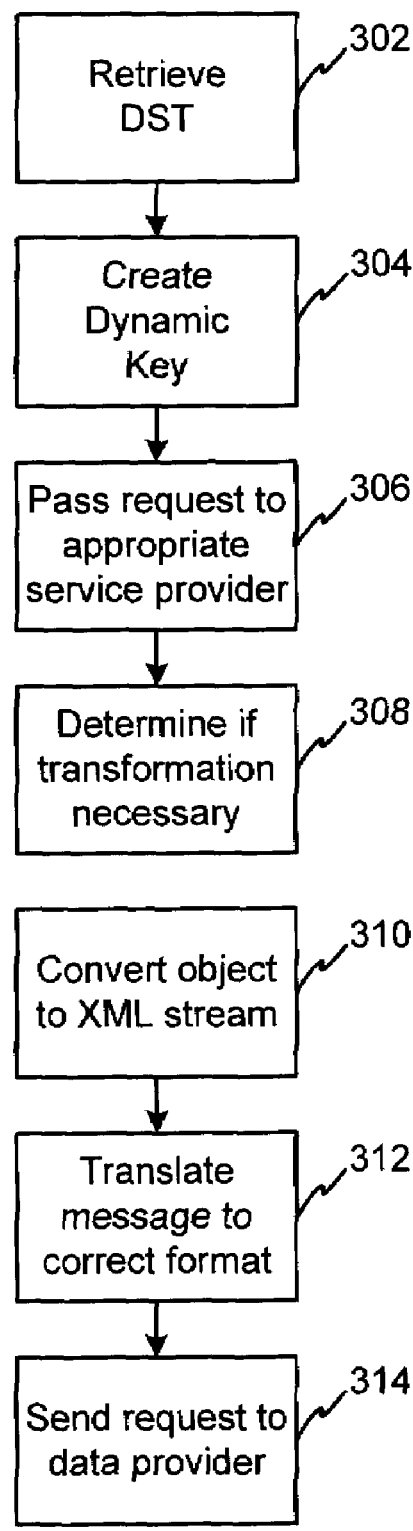
FIG. 3 presents a flow chart illustrating exemplary steps in creating a PutMessage.

FIG. 3 is a flowchart illustrating the operation of an exemplary embodiment of the present invention when exporting data to a data source (e.g., a PutMessage). DST files are stored in the file system. For performance reasons, as the DST files are used, they may be stored in shared memory so that a file does not need to be loaded every time a DST is used. In that regard, a request is converted into a NET request object and the DST file may have been retrieved as a NET request object from the calling component. (step 302). A dynamic key is then built for the requested transaction to determine if the request has already been made (step 304) to minimize multiple requests for the same data. A DST specifies the elements that may be "key" elements that uniquely identify the request. As such, a key is built using the DST name concatenated with the value of each key element.

The request is then passed to the appropriate service provider component (step 306). For example, certain requests could be serviced by SQL Server, while other requests are serviced by MQXML, depending on the native format of the data. The service provider component determines whether a message transformation is needed (step 308). If the message format is XML, a .NET serialization converts the requested object to an XML stream (step 310). Otherwise, a Message Transformation component is used to translate the message to the correct format (step 312). The format may be determined by the MessageType element in the DST file. This element defines the data source, and thus, it defines the sub-component to use to access the data. The sub-component includes information related to the data format the data source desires of the data. The request is then sent to the data source for processing (step 314). The message ID may also be provided to the requesting application. The message ID may be desired so that the client can retrieve the responses by specifying the Message ID in the GetMessage.

Figure 4:
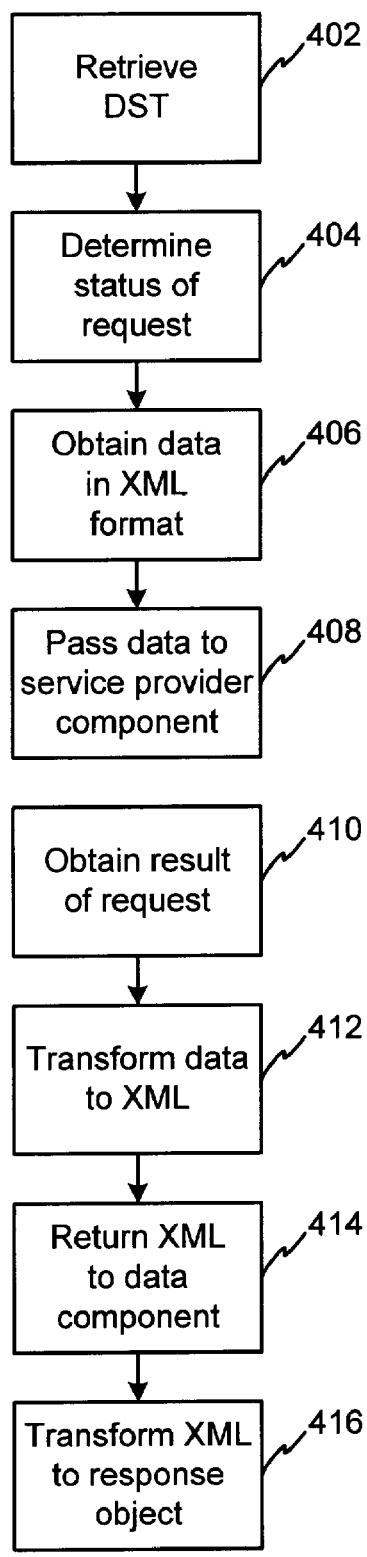
FIG. 4 presents a flow chart illustrating exemplary steps in creating a GetMessage.

A GetMessage operation to retrieve data from a data source is performed as illustrated in FIG. 4. Data component 130 looks up the DST for the requested service (step 402) and the status of the request is determined (step 404). The status may be determined in a variety of different manners such as, for example, when a request is made, an entry may be made in a database, including a message id. The entry is updated when the request is completed. The status of the request may be determined by retrieving the record of the request from the database. Such a request can be made in a variety of different manners, such as an SQL SELECT statement. If the data is available in SQL format, the data is obtained in XML format (step 406). If the protocol of the data is MQ, the data is passed to the appropriate service provider component (step 408). The service provider component obtains the result of the request from the external data source (step 410). If a transformation is required (as indicated by the DST), a Message Transformation component is used to transform the native format to XML (step 412). The resulting XML is returned to data component 130 (step 414). The XML is de-serialized and translated into a NET response object, which is then returned to the requesting application (step 416).

In one embodiment, the above-described method is used in asynchronous communication, in which obtaining data requires two steps, a request and a reply. In another embodiment, synchronous communication is used when the request can be satisfied upon being received by the data source. In such a situation, the steps taken are similar. However, after the data is sent to the data source for processing (step 314), the next step will be to determine if a transformation is required (step 412). From there, similar steps to those illustrated in FIG. 4 are followed.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, Mac OS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, Dilip Naik, "Internet Standards and Protocols" (1998); "Java 2 Complete", various authors, (Sybex 1999); Deborah Ray and Eric Ray, "Mastering HTML 4.0" (1997). Loshin, "TCP/IP Clearly Explained" (1997). All of these texts are hereby incorporated by reference.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

The invention claimed is:

1. A method for a software application of a first format to access external data of a format different from the first format, comprising:
    receiving a transaction infrastructure object requesting data;
    receiving a data service transaction name;
    retrieving a data service transaction corresponding to the data service transaction name;
    converting the transaction infrastructure object into a different format using an input element of the data service transaction;
    sending the converted transaction infrastructure object to a data source;
    obtaining the data from the data source;
    transforming the data into a transaction infrastructure response object using an output element of the data service transaction; and
    retrieving the transaction infrastructure response object to be accessed by a Web page or a Web service.

2. The method of claim 1, wherein said step of transforming the data into a transaction infrastructure response object includes
    transforming the data into an XML format; and
    transforming the XML format into a .NET response object.

3. The method of claim 1, wherein the transaction infrastructure object includes at least one of a .NEW object, Java Bean and Java Enterprise Edition.

4. The method of claim 1, wherein the transaction infrastructure response object includes at least one of a .NET object, Java Bean and Java Enterprise Edition.

5. A computer program product comprising a computer usable medium having control logic stored therein for causing a software application of a first format to access external data of a format different from the first format, said control logic comprising:
    computer readable program code means for causing the computer to receive a transaction infrastructure object requesting data;
    computer readable program code means for causing the computer to receive a data service transaction name;
    computer readable program code means for causing the computer to retrieve a data service transaction corresponding to the data service transaction name;
    computer readable program code means for causing the computer to convert the transaction infrastructure object into a different format using an input element of the data service transaction;
    computer readable program code means for causing the computer to send the converted transaction infrastructure object to a data source;

computer readable program code means for causing the computer to obtain the data from the data source;

computer readable program code means for causing the computer to transform the data into a transaction infrastructure response object using an output element of the data service transaction; and computer readable program code means for causing the computer to retrieve the transaction infrastructure response object to be accessed by a Web page or a Web service.

6. The computer program product of claim 5, wherein the transaction infrastructure response object includes at least one of a .NET object, Java Bean and Java Enterprise Edition.

7. The computer program product of claim 6, further comprising:

computer readable program code means for causing the computer to transform the data into an XML format; and computer readable program code means for causing the computer to transform the XML format into a .NET response object.

8. The computer program product of claim 6, wherein the transaction infrastructure object includes at least one of a .NEW object, Java Bean and Java Enterprise Edition.

9. A system for enabling a software application of a first format to access external data of a format different from the first format, comprising:

means for receiving a transaction infrastructure object requesting data;

means for receiving a data service transaction name;

means for retrieving a data service transaction corresponding to the data service transaction name;

means for converting the transaction infrastructure object into a different format using an input element of the data service transaction;

means for sending the converted transaction infrastructure object to a data source;

means for obtaining the data from the data source;

means for transforming the data into a transaction infrastructure response object using an output element of the data service transaction; and means for retrieving the transaction infrastructure response object to be accessed by a Web page or a Web service.

* * * * *

UNITED STATES PATENT AND TRADEMARK OFFICE
CERTIFICATE OF CORRECTION

| | | |
|---|---|---|
| PATENT NO. | : 7,310,631 B2 | |
| APPLICATION NO. | : 10/708589 | |
| DATED | : December 18, 2007 | |
| INVENTOR(S) | : Martin Kartzmark et al. | |

It is certified that error appears in the above-identified patent and that said Letters Patent is hereby corrected as shown below:

COLUMN 2

Line 13, "NET object" should read --.NET object--.
    Line 20, "NET object," should read --.NET object,--.
    Line 34, "NET object" should read --.NET object--.

COLUMN 3

Line 38, "Wash.," should read --Wash.),--.

COLUMN 4

Line 29, "includes" should read --includes a--.
    Line 39, "Microsoft®NET" should read --Microsoft®.NET--.
    Line 45, "a" should read --an--.

COLUMN 5

Line 3, "NET object." should read --.NET object.--.
    Line 4, "NET object" should read --.NET object--.

COLUMN 7

Line 35, "a Authorization transaction" should read --an Authorization Transaction--.
    Line 36, "an" should read --a--.
    Line 67, "only" should read --only be--.

COLUMN 9

Line 2, "a" should read --an--.
    Line 6, "If" should read --if the--.

COLUMN 11

Line 38, "servers are" should read --servers and--.
    Line 52, "NET request" should read --.NET request--.
    Line 53, "NET request" should read --.NET request--.

UNITED STATES PATENT AND TRADEMARK OFFICE
CERTIFICATE OF CORRECTION

PATENT NO. : 7,310,631 B2
APPLICATION NO. : 10/708589
DATED : December 18, 2007
INVENTOR(S) : Martin Kartzmark et al.

It is certified that error appears in the above-identified patent and that said Letters Patent is hereby corrected as shown below:

COLUMN 12

Line 35, "NET response" should read --.NET response--.

COLUMN 14

Line 38 Claim 2, "includes" should read --includes:--.
Line 43 Claim 3, ".NEW object," should read --.NET object,--.

COLUMN 15

Line 24 Claim 8, ".NEW object," should read --.NET object,--.

Signed and Sealed this

Twenty-ninth Day of July, 2008

JON W. DUDAS
*Director of the United States Patent and Trademark Office*